D. ROBERTS & C. JAMES.
STEERING DEVICE FOR MOTOR VEHICLES.
APPLICATION FILED MAR. 14, 1908.

910,232.

Patented Jan. 19, 1909.
4 SHEETS—SHEET 1.

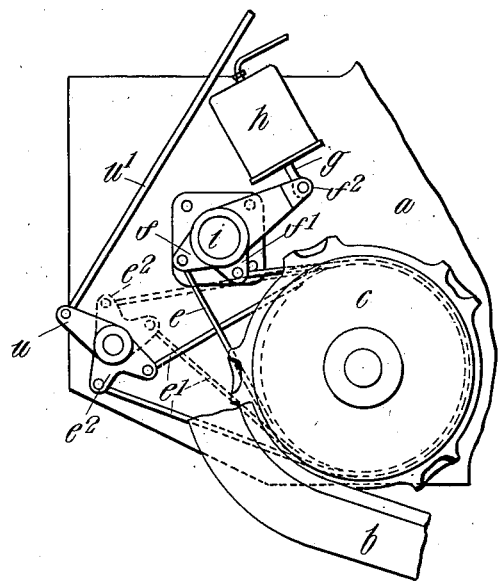
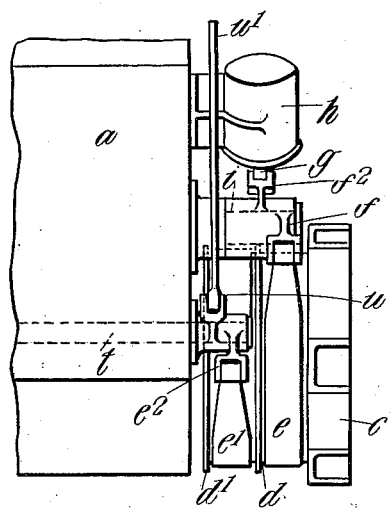

UNITED STATES PATENT OFFICE.

DAVID ROBERTS AND CHARLES JAMES, OF GRANTHAM, ENGLAND.

STEERING DEVICE FOR MOTOR-VEHICLES.

No. 910,232.   Specification of Letters Patent.   Patented Jan. 19, 1909.

Application filed March 14, 1908. Serial No. 421,174.

*To all whom it may concern:*

Be it known that we, DAVID ROBERTS and CHARLES JAMES, both subjects of the King of Great Britain, and residing at Spittlegate Ironworks, Grantham, Lincolnshire, England, have invented new and useful Improvements in Steering Devices for Motor-Vehicles, of which the following is a specification.

Our invention relates to improvements in the means of steering traction engines, road locomotives, and motor vehicles of the kind described in the specification of our former British patent No. 16345 of 1904.

The method described in the aforesaid former specification of steering by hand power has been found in practice not to be sufficiently powerful and quick in operation for heavy traction engines and heavy motor vehicles when running on difficult ground or in difficult positions, and the object of our present invention is to overcome these defects. To this end we employ, in conjunction with a modified type of the hand steering gear, power steering gear actuated by compressed air or gas.

To enable the invention to be fully understood, we will describe it by reference to the accompanying drawings, in which:—

Figure 1:
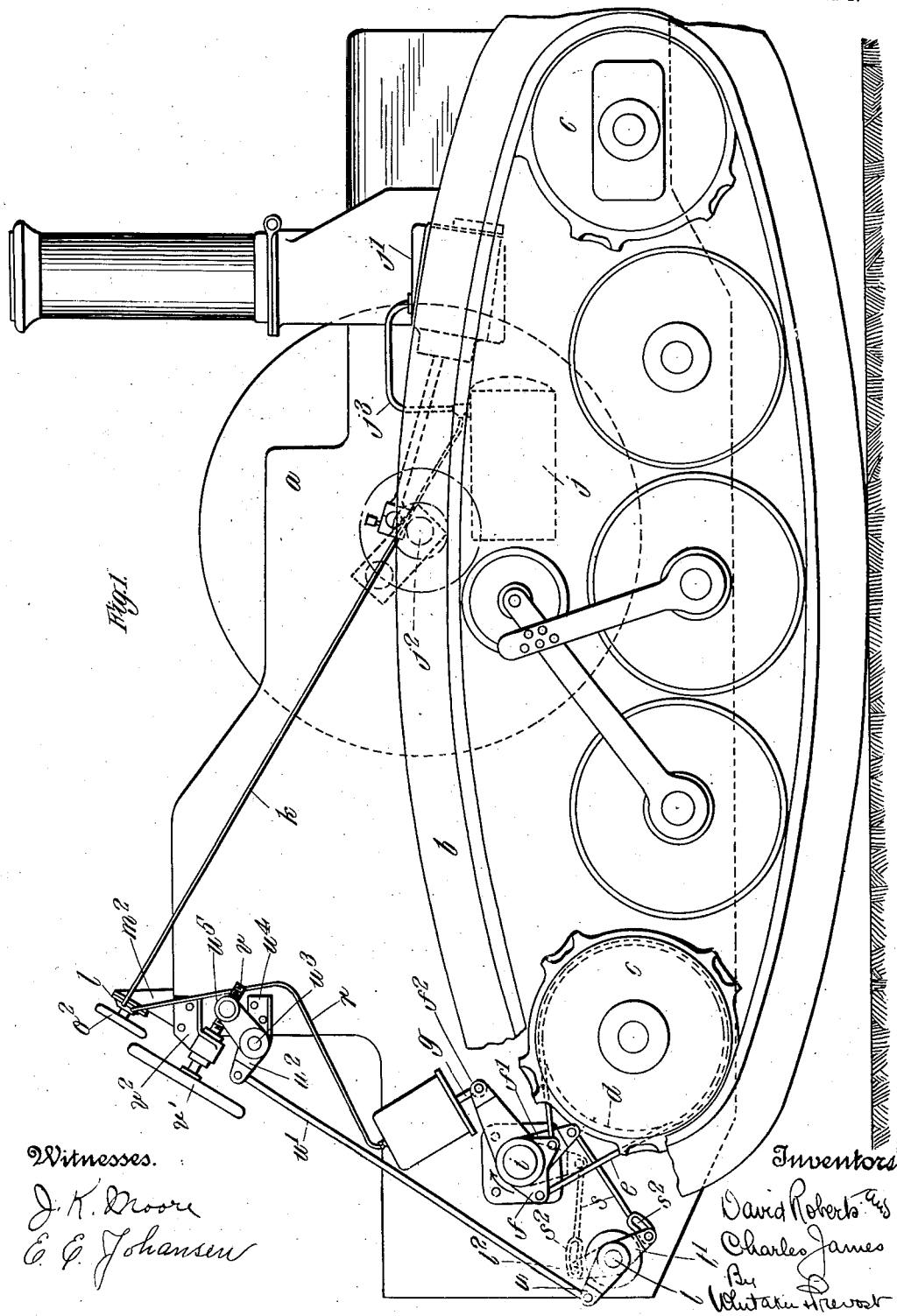
Figure 2:
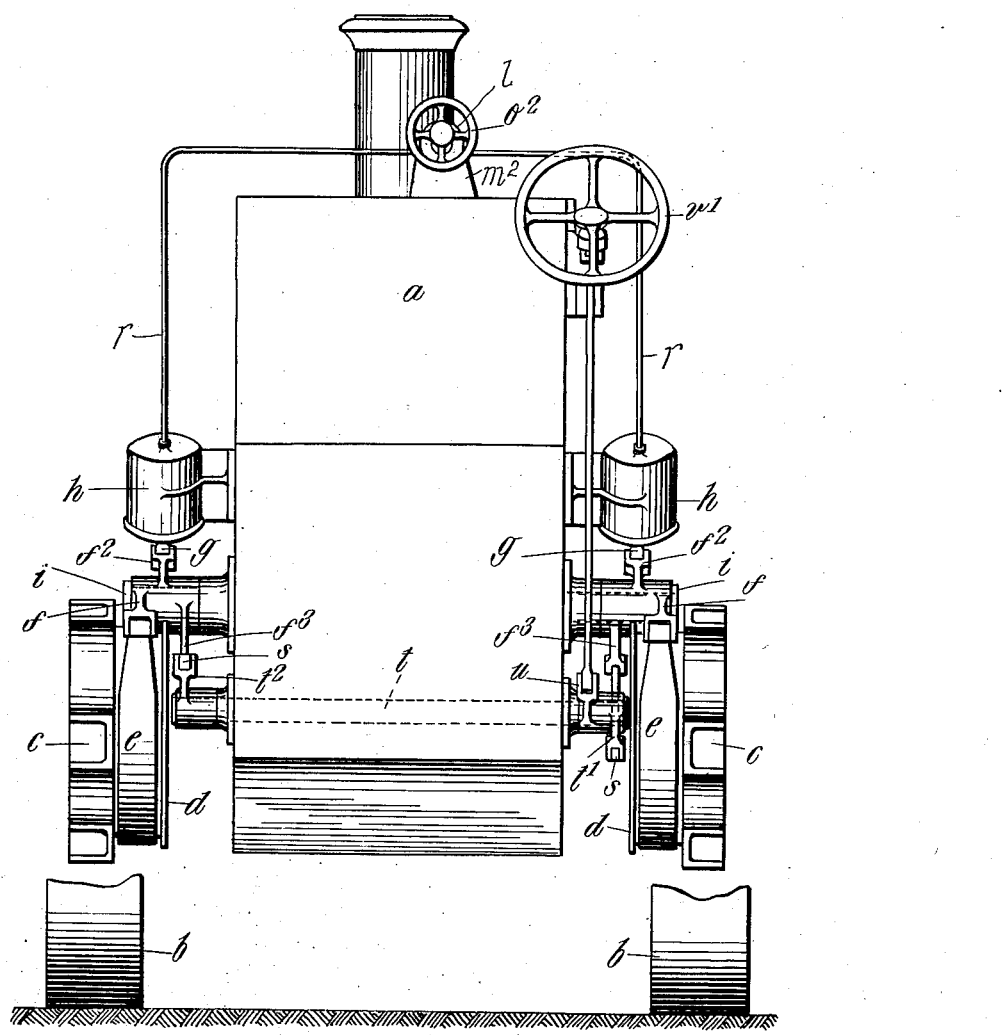
Figure 3:
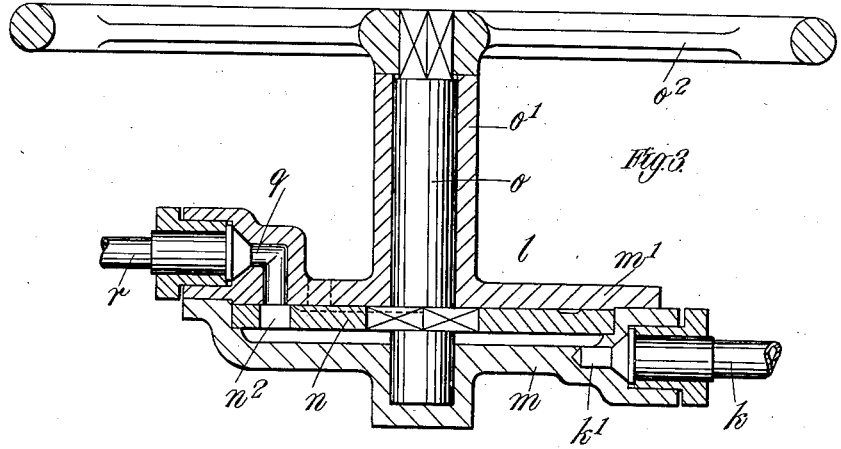
Figure 4:
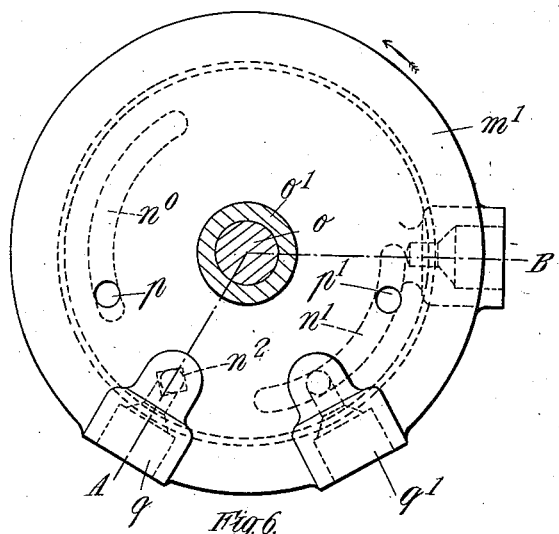
Figures 5, 6:
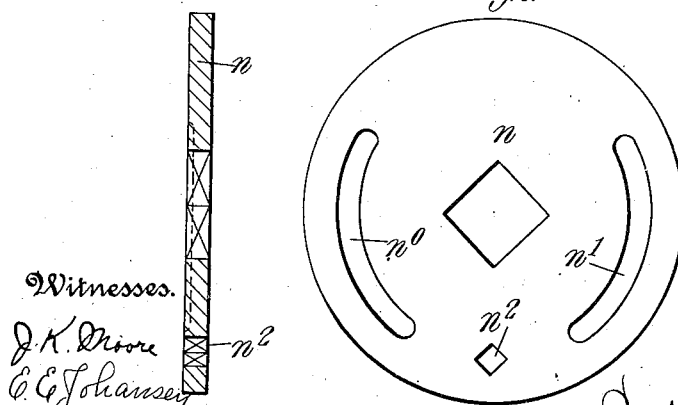

Figure 1 is a side elevation of a road locomotive having the improvements applied thereto. Fig. 2 is an end view thereof with a part of the self-laid tracks removed to show the steering mechanism. Fig. 3 is a vertical section drawn to a larger scale of the distributing valve for the compressed air or gas. Fig. 4 is a sectional plan view thereof, and Figs. 5 and 6 are a section and a plan view respectively of a detail thereof. Figs. 7 and 8 are a side view and an end view respectively of a modified form of the steering gear.

Referring first to the construction illustrated in Figs. 1 to 6 $a$ represents the road locomotive, $b$, $b$ the self-laid tracks thereof, and $c$, $c$ the sprocket wheels for driving the said tracks, the construction of the vehicle being similar to that described in the specification of former patent No. 16345 of 1904. The rear sprocket wheel $c$ on each side of the vehicle is formed with a brake-ring or wheel $d$ around which passes a brake-band $e$, the ends of this brake-band being connected respectively to two arms $f$, $f^1$ upon a bell-crank lever a third arm $f^2$ of which is connected to the piston rod $g$ of an open-ended brake cylinder $h$; the bell-crank lever $f$, $f^1$, $f^2$ being rotatably mounted upon a short shaft or stud $i$ laterally projecting from the vehicle. The compressed air or gas controlling the power brakes $h$ is supplied from a reservoir $j$, which is maintained stored with air at the requisite pressure by means of the pump $j^1$ actuated from the crank shaft $j^2$ of the motor driving the locomotive through the pipe $j^3$, connecting the pump $j^1$ with the reservoir $j$. From the reservoir $j$ the compressed air passes through the pipe $k$ to the distributing valve $l$, which supplies the said air to, and allows it to exhaust from, the two power brake cylinders $h$.

The construction of the distributing valve $l$ is shown in detail in Figs. 3 to 6 and it comprises the casing $m$ having a cover $m^1$ and within which is rotatably mounted the disk-valve $m$, the said disk-valve being keyed upon the spindle $o$ which extends upward through a bearing $o^1$ forming part of the cover $m^1$ and having keyed upon its upper projecting end a hand-wheel $o^2$ by turning which the said disk-valve is turned within the casing $m$. The upper face of the disk-valve $n$ is formed with two segmental channels or grooves $n^0$, $n^1$ and with a port $n^2$ extending completely through it and the cover $m^1$ of the casing is provided with two exhaust ports $p$, $p^1$ and with two discharge nozzles $q$, $q^1$ which are connected respectively by means of the pipes $r$, $r$ to the right and left hand brake cylinders $h$. The pipe $k$ from the air reservoir opens into the interior of the casing $m$, as shown at $k^1$. The casing $m$ is mounted upon the bracket $m^2$ fixed to the frame work of the locomotive. The operation of this part of the steering gear is as follows, that is to say, assuming that the hand-wheel $o^2$ be turned into the position indicated in Figs. 3 and 4 compressed air from the reservoir $j$ passes through the pipe $k$ into the casing $m$ and thence flows through the port $n^2$ in the disk-valve $n$ through the discharge nozzle $q$ and through the pipe $r$ into the right hand brake cylinder $h$ so as to force the piston therein downwards thereby turning the bell-crank lever $f$, $f^1$, $f^2$ in the direction of the arrow Fig. 1, and applying the brake-band on the right hand brake-wheel $d$ so as to cause the vehicle to turn to the right. If, now, the hand-wheel $o^2$ is turned in the direction of the arrow, Fig. 4, the segmental groove or channel $n^0$ in the disk $n$ is brought into coincidence with the nozzle $q$ and simultaneously with the exhaust outlet $p$ thus permitting the air to escape from the brake cylinders through the said exhaust port $p$. By turning the hand-wheel $o^2$ still further the orifice $n^2$ in the disk-valve $n$ is brought into coincidence with the outlet nozzle $q^1$ so that compressed air is then supplied to the left hand cylinder in a manner similar to that above described with respect to the right hand cylinder $h$. The vehicle is then steered in the opposite direction and by turning the hand-wheel $o^2$ in the reverse direction, and that is to say, in a direction opposite to that indicated by the arrow, Fig. 4, the compressed air in the left hand cylinder can be exhausted through the exhaust port $p^1$. By adjusting the hand-wheel $o^2$ so that it occupies a position intermediate of the two positions above referred to the two brake cylinders $h$, $h$ are both rendered inoperative.

It will be obvious that in lieu of the compressed air, provided by means of a separate pump, for actuating the power brakes we may make use of the compressed air or gas which is used for starting engines of the internal combustion type when such are employed for driving the vehicle. This reservoir may be kept charged by by-passing some of the gasses from the explosion or power stroke of the motor. Furthermore, for the purpose of economizing power when the reservoir is charged to a predetermined pressure the pump, when such is used, may be fitted with an automatic unloading device of any well-known type. Each of the bell-crank levers $f, f^1, f^2$ is also provided with an arm $f^3$ which is connected by means of a link $s$ having a slotted end $s^2$. The slotted end of each of the levers engages an arm upon a shaft $t$ extending transversely across the vehicle. The arm $t$ on the said shaft upon one side of the vehicle extends downwards relatively with the said transverse shaft while the arm $t^2$ on the other side of the vehicle extends in an upward direction. The cross shaft $t$ has also keyed upon it a lever $u$ which is connected by means of a link $u^1$ with an arm $u^2$ of a bell-crank lever pivotally mounted at $u^3$ to a bracket $u^4$ fixed to the vehicle frame. The other arm $u^5$ of this bell-crank lever is formed with a nut which engages with a screw $v$ upon a spindle provided with a hand-wheel $v^1$ and mounted in a bracket $v^2$. With this construction it will be obvious that by turning the hand-wheel $v^1$ the lever and link gear is operated so as to actuate the bell-crank levers $f, f^1, f^2$ thereby tightening and loosening the brake bands $e$, $e$ respectively upon their brake-wheels $d$.

The slots $s^2$ are provided in the links $s$ in order that the power brakes may be applied independently of the hand brakes.

In the construction illustrated in Figs. 7 and 8 the hand and power brakes are arranged to act independently of one another. To this end each of the driving sprocke wheels $c$ at the rear of the vehicle is formed with two brake drums or wheels $d$, $d^1$, the brake drums $d$ being provided with the bands $e$, $e$ actuated by the power cylinders $h$, as above described, while the brake drums $d^1$ receive the bands $e^1$, $e^1$ which are controlled through the medium of bell-cranks $e^2$ by the hand power mechanism from the cross shaft $t$ in the manner above described. In other respects this construction is similar to that shown in Figs. 1 to 6. Although in the drawings the driving sprocket wheels are shown as the rear wheels it will be understood that the driving wheels may be the front wheels or wheels arranged at the middle of the tracks.

Having now particularly described and ascertained the nature of our said invention and in what manner the same is to be performed, we declare that what we claim is:—

1. In a motor vehicle, the combination with a self laid track on each side of the same, of independent driving wheels engaging and operating said tracks, a separate brake mechanism for the driving wheel of each track, actuating mechanisms operated by an expansive fluid, operatively connected with said brake mechanisms, and a hand operated controlling mechanism for said actuating mechanisms, substantially as described.

2. In a motor vehicle, the combination with a self laid track on each side of the same, of independent driving wheels engaging and operating said tracks, a separate brake mechanism for the driving wheel of each track, actuating mechanisms operated by an expansive fluid, operatively connected with said brake mechanisms, a hand operated controlling mechanism for said actuating mechanisms comprising a distributing valve controlling the supply of fluid to said cylinders, and means for actuating said valve, substantially as described.

3. In a motor vehicle, the combination with a self laid track on each side of the same, of independent driving wheels engaging and operating said tracks, a separate brake mechanism for the driving wheel of each track, actuating mechanisms operated by an expansive fluid, operatively connected with said brake mechanisms, a hand operated controlling mechanism for said actuating mechanisms, a separate hand operated device and direct connections therefrom to the said brake mechanisms, whereby the latter may be operated entirely by hand or by power as desired, substantially as described.

4. A motor vehicle provided on each side with a self laid track, a driving wheel for each of said tracks, a brake band for each of said wheels, a lever for operating each of said bands, a separate power cylinder connected to each of said levers, a controlling valve connected with both of said cylinders, a supply pipe for compressed fluid connected with said valve, a hand operated device for controlling said valve, a separate hand operated device, and connections therefrom to said band operating lever, substantially as described.

DAVID ROBERTS.
CHARLES JAMES.

Witnesses:
 WALTER HAYNES,
 SAMUEL WILLIAM PAYNE.